United States Patent
Sickel et al.

(10) Patent No.: US 10,417,645 B2
(45) Date of Patent: Sep. 17, 2019

(54) UNIVERSAL REDEMPTION VEHICLE

(75) Inventors: Steven Scott Sickel, Alpharetta, GA (US); Michael John Kopec, Roswell, GA (US); Marc Elliot Berman, Dover, MA (US)

(73) Assignee: SIX CONTINENTS HOTELS, INC., Atlanta, GA (US)

(*) Notice: Subject to any disclaimer, the term of this patent is extended or adjusted under 35 U.S.C. 154(b) by 922 days.

(21) Appl. No.: 11/408,192

(22) Filed: Apr. 20, 2006

(65) Prior Publication Data

US 2006/0271432 A1 Nov. 30, 2006

Related U.S. Application Data

(60) Provisional application No. 60/674,149, filed on Apr. 22, 2005.

(51) Int. Cl.
*G06Q 30/00* (2012.01)
*G06Q 30/02* (2012.01)

(52) U.S. Cl.
CPC ......... *G06Q 30/02* (2013.01); *G06Q 30/0227* (2013.01); *G06Q 30/0229* (2013.01); *G06Q 30/0233* (2013.01)

(58) Field of Classification Search
CPC ........... G06Q 30/0233; G06Q 30/0227; G06Q 30/0229
USPC .................................. 705/14.33, 14.28, 14.3
See application file for complete search history.

(56) References Cited

U.S. PATENT DOCUMENTS

| | | |
|---|---|---|
| 5,056,019 A | 10/1991 | Schultz et al. |
| 5,937,391 A * | 8/1999 | Ikeda et al. ..................... 705/14 |
| 6,128,599 A | 10/2000 | Walker et al. |
| 6,327,573 B1 | 12/2001 | Walker et al. |
| 6,594,640 B1 | 7/2003 | Postrel |
| 6,820,061 B2 | 11/2004 | Postrel |
| 6,829,586 B2 | 12/2004 | Postrel |
| 6,842,739 B2 | 1/2005 | Postrel |
| 6,947,898 B2 | 9/2005 | Postrel |
| 6,980,962 B1 | 12/2005 | Arganbright et al. |

(Continued)

FOREIGN PATENT DOCUMENTS

| | | |
|---|---|---|
| JP | 10-078989 A | 3/1998 |
| JP | 2002-133247 A | 5/2002 |

(Continued)

OTHER PUBLICATIONS

Written Opinion for Singapore Application No. SG 200717888-2 filed Apr. 21, 2006.

(Continued)

*Primary Examiner* — Michael Bekerman
(74) *Attorney, Agent, or Firm* — Kilpatrick Townsend & Stockton LLP

(57) ABSTRACT

A reward point system comprising an industry vertical reception unit for receiving a user selected monetary value in a selected industry vertical, a point collection unit for receiving a quantity of points associated with the monetary value in the selected industry vertical, a redemption vehicle profile creation unit for generating a profile, and a redemption vehicle generation unit for loading the profile onto a redemption vehicle wherein the points on the redemption vehicle can be redeemed at any merchant in the selected industry vertical. Also provided are methods for utilizing said system.

13 Claims, 6 Drawing Sheets

(56) References Cited

U.S. PATENT DOCUMENTS

| | | | |
|---|---|---|---|
| 6,985,879 | B2 | 1/2006 | Walker et al. |
| 7,096,190 | B2 | 8/2006 | Postrel |
| 2002/0026348 | A1* | 2/2002 | Fowler et al. ................. 705/10 |
| 2002/0107731 | A1 | 8/2002 | Teng ............................... 705/14 |
| 2003/0236704 | A1* | 12/2003 | Antonucci ...................... 705/14 |
| 2004/0122734 | A1 | 6/2004 | Schleicher et al. ............. 705/14 |
| 2004/0243468 | A1* | 12/2004 | Cohagan et al. ............... 705/14 |
| 2005/0021400 | A1* | 1/2005 | Postrel ............................ 705/14 |
| 2006/0161478 | A1* | 7/2006 | Turner et al. ................... 705/14 |

FOREIGN PATENT DOCUMENTS

| | | | |
|---|---|---|---|
| JP | 2002-150097 | A | 5/2002 |
| JP | 2002-157491 | A | 5/2002 |
| JP | 2002245549 | | 8/2002 |
| JP | 2002-259781 | A | 9/2002 |
| JP | 2003-233745 | A | 8/2003 |
| JP | 2003-281383 | A | 10/2003 |
| JP | 2003-303298 | A | 10/2003 |
| JP | 2004126998 | | 4/2004 |
| JP | 2004-185589 | A | 7/2004 |
| JP | 2004192502 | | 7/2004 |
| JP | 2005-044137 | A | 2/2005 |
| RU | 2161328 | C1 | 12/2000 |
| WO | 00/79461 | A1 | 12/2000 |
| WO | 04/079506 | A2 | 9/2004 |

OTHER PUBLICATIONS

Second Written Opinion for Singapore Application No. SG 200717888-2 filed Apr. 21, 2006.
Japanese Application No. 2008-507971, Notice of Reasons for Rejection, dated Apr. 19, 2013, 15 pages.
Supplementary European Search Report Dated Nov. 13, 2009 for European Application No. EP 06 75 8525.7.
Australian Application No. 2006239907, First Examiner's Report dated Dec. 9, 2010.
Australian Application No. 2006239907, Second Examiner's Report dated Jan. 18, 2012, 2 pages.
Australian Application No. 2006239907, Third Examiner's Report dated Sep. 6, 2012, 7 pages.
Canadian Application No. 2,605,608, Office Action dated Feb. 24, 2012, 5 pages.
Chinese Application No. 200680021635.3, Office Action dated Nov. 25, 2011, 9 pages.
Chinese Application No. 200680021635.3, Office Action dated Aug. 23, 2010.
Japanese Application No. 2008-507971, Office Action dated Jun. 8, 2011, 9 pages.
Japanese Application No. 2008-507971, Office Action dated Dec. 7, 2012, 10 pages.
Mexican Application No. MX/a/2007/013214, Office Action dated Apr. 20, 2011.
Canadian Patent Application No. 2,605,608, Office Action dated Nov. 21, 2013.
Japanese Patent Application No. 2012-141105, Official Action dated Oct. 21, 2013.
Japanese Patent Application No. 2008-507971, Decision mailed Nov. 25, 2013.
European Application No. 06 758 525.7—1958, Examination Report dated Mar. 19, 2014.
Japanese Patent Application No. 2012-141105, Official Action—Notice of Reasons for Rejection, dated Sep. 29, 2014, with English translation.
Hisashi Noguchi, "From "premium" to "virtual currency", the rise of point economy closing on money", CardWave, C-media K.K., May 19, 2003, No. 16, vol. 6, p. 42-45.
"What that lies ahead of point cards—thorough evaluation of the "next step" by that high-profile corporation", CardWave, C-media K.K., Apr. 18, 2003, No. 16, vol. 5, p. 10-11.
JP2014-87071, "Office Action," dated Jul. 4, 2016, 9 pages.
JP2014-87071, "Notice of Allowance," dated Nov. 21, 2016, 3 pages.
JP2012-141105, "Denial of Entry of Amendment and Final Rejection," dated Sep. 11, 2015, 6 pages.
JP2014-87071, "Notice of Reasons for Rejection," dated Oct. 6, 2015, 3 pages.

* cited by examiner

UNIVERSAL REDEMPTION VEHICLE

CROSS REFERENCE TO RELATED PATENT APPLICATION

This application claims priority to U.S. Provisional Application No. 60/674,149 filed Apr. 22, 2005, herein incorporated by reference in its entirety.

BACKGROUND OF THE INVENTION

The loyalty industry provides rewards and redemptions for program members within certain parameters in exchange for program members earning loyalty credits via the usage of products or services with the affiliated host company. In some instances rewards and redemptions can be provided via purchases on a co-branded credit card or usage of a contracted partner company product or service. In these programs, redemptions take place within a stand alone affiliated brand of the host company for that industry vertical or with a contracted partner company that may or may not be in that industry vertical. For example, rewards and redemptions can be provided to a customer of Hotel Company A, for use at Hotel Company A. In all cases there is a direct relationship between the host company, the loyalty program and a contracted partner company for member redemption.

SUMMARY OF THE INVENTION

Disclosed is a reward point system comprising an industry vertical reception unit for receiving a user selected monetary value in a selected industry vertical, a point collection unit for receiving a quantity of points associated with the monetary value in the selected industry vertical, a redemption vehicle profile creation unit for generating a profile, and a redemption vehicle generation unit for loading the profile onto a redemption vehicle wherein the points on the redemption vehicle can be redeemed at any merchant in the selected industry vertical. The industry vertical reception unit can further comprise a point balance determining unit for determining if a user's point balance meets a minimum balance required for the monetary value in the selected industry vertical. The industry vertical reception unit can also further comprise a point balance addition unit for adding points to a user's point balance. The points can be obtained from one merchant. The points can be obtained from a plurality of merchants. The profile can comprise, for example, a user name, a selected industry vertical, and a quantity of points associated with the selected industry vertical. The industry vertical can include, for example, lodging, retail purchases, airlines, car rentals, entertainment related activities, sporting events, sporting activities, cruises, and travel packages. The redemption vehicle can be, for example, a magnetic stripe card, a smart card, or a code.

Also disclosed is a method for providing a redemption vehicle comprising receiving a redemption request, generating a redemption vehicle profile in response to the redemption request, and generating a redemption vehicle in response to the profile wherein the redemption vehicle is loaded with points and the points on the redemption vehicle can be redeemed at any merchant in the selected industry vertical. The method can further comprise limiting the merchants accepting points within the selected industry vertical. The step of receiving a redemption request can further comprise determining if a minimum balance of points is available to fulfill the redemption request and presenting an option to add points so as to meet the minimum balance. The points can be obtained from one merchant. The points can be obtained from a plurality of merchants. The profile can comprise, for example, a user name, a selected industry vertical, and a quantity of points associated with the selected industry vertical. The industry vertical can include, for example, lodging, retail purchases, airlines, car rentals, entertainment related activities, sporting events, sporting activities, cruises, and travel packages. The redemption vehicle can be, for example, a magnetic stripe card, a smart card, or a code.

Further disclosed is a method for providing a redemption vehicle comprising receiving a redemption vehicle profile and generating a redemption vehicle in response to the profile wherein the redemption vehicle is loaded with points and the points on the redemption vehicle can be redeemed at any merchant in the selected industry vertical. The method can further comprise transmitting the redemption vehicle to a user. The points can be obtained from one merchant. The points can be obtained from a plurality of merchants. The profile can comprise, for example, a user name, a selected industry vertical, and a quantity of points associated with the selected industry vertical. The industry vertical can include, for example, lodging, retail purchases, airlines, car rentals, entertainment related activities, sporting events, sporting activities, cruises, and travel packages. The redemption vehicle can be, for example, a magnetic stripe card, a smart card, or a code.

Additional advantages of the invention will be set forth in part in the description which follows or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DETAILED DESCRIPTION OF THE INVENTION

Before the present methods and systems are disclosed and described, it is to be understood that this invention is not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise.

Ranges may be expressed herein as from "about" one particular value, and/or to "about" another particular value.

When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. For example, the phrase "optionally processes hotel transactions" means that the hotel transaction may or may not be processed and that the description includes both processing the hotel transaction and not processing the hotel transaction where there is substitution.

As used herein, redemption vehicle refers to a vehicle that can either have a non monetized value or a monetized value The present invention may be understood more readily by reference to the following detailed description of preferred embodiments of the invention and the Examples included therein and to the Figures and their previous and following description.

I. Methods

A. Generally

Figures 5A, 5B:
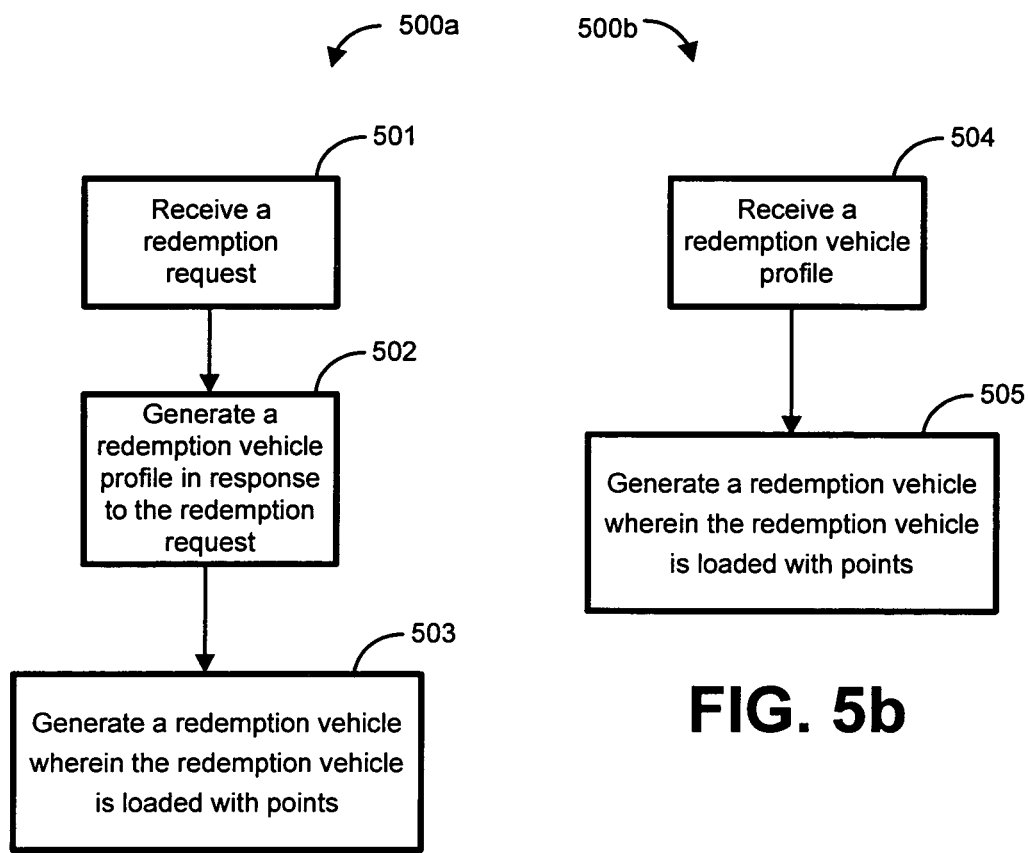
FIGS. 5a and 5b are flowcharts representing exemplary methods.

As illustrated in FIG. 5a, disclosed is a method 500a for providing a redemption vehicle comprising receiving a redemption request at block 501, generating a redemption vehicle profile in response to the redemption request at block 502, and generating a redemption vehicle in response to the profile wherein the redemption vehicle is loaded with points and the points on the redemption vehicle can be redeemed at any merchant in the selected industry vertical at block 503. The method can further comprise limiting the merchants accepting points within the selected industry vertical. This can restrict a user to only redeeming points at, for example, a specific hotel chain, specific airline, and the like. The step of receiving a redemption request can further comprise determining if a minimum balance of points is available to fulfill the redemption request and presenting an option to add points so as to meet the minimum balance. Different entities can practice each step. Alternatively, a single entity can practice each step. The points can be obtained from one merchant. The points can be obtained from a plurality of merchants. The profile can comprise, for example, a user name, a selected industry vertical, and a quantity of points associated with the selected industry vertical. The industry vertical can include, for example, lodging, retail purchases, airlines, car rentals, entertainment related activities, sporting events, sporting activities, cruises, and travel packages. The redemption vehicle can be, for example, a magnetic stripe card, a smart card, or a code. The redemption vehicle can be a card that can be "swiped." Swiped includes passing through a magnetic stripe reader, RFID based detection, and the like. The redemption vehicle can be personalized in various manners, for example with a user name/gift names. The redemption vehicle can store user information that could be used for check in/user identification. The redemption vehicle can be used to load and redeposit points into another user's account.

As illustrated in FIG. 5b, disclosed is a method 500b for providing a redemption vehicle comprising receiving a redemption vehicle profile at block 504 and generating a redemption vehicle in response to the profile wherein the redemption vehicle is loaded with points and the points on the redemption vehicle can be redeemed at any merchant in the selected industry vertical at block 505. The method can further comprise transmitting the redemption vehicle to a user. Different entities can practice each step. Alternatively, a single entity can practice each step. The points can be obtained from one merchant. The points can be obtained from a plurality of merchants. The profile can comprise, for example, a user name, a selected industry vertical, and a quantity of points associated with the selected industry vertical. The industry vertical can include, for example, lodging, retail purchases, airlines, car rentals, entertainment related activities, sporting events, sporting activities, cruises, and travel packages. The redemption vehicle can be, for example, a magnetic stripe card, a smart card, or a code. The redemption vehicle can be a card that can be "swiped." Swiped includes passing through a magnetic stripe reader, RFID based detection, and the like. The redemption vehicle can be personalized in various manners, for example with a user name/gift names. The redemption vehicle can store user information that could be used for check in/user identification. The redemption vehicle can be used to load and redeposit points into another user's account.

In either method above, upon receipt of the redemption vehicle, the user may or may not be required to activate the redemption vehicle either by an on-line URL or offline (call center) IVR process. The redemption vehicle is then activated for redemption. In an offline environment the user can contact a call center and redeem for predetermined redemption values. The call center can authorize the transaction and transmit the redemption request to the vehicle issuer processing center. The vehicle can then be produced and fulfilled by same.

In an embodiment, only a subset of users can be allowed to accumulate and redeem points. Furthermore, within that subset, more subsets can be established, for example, elite, or preferred, or targeted users. Within these smaller subsets, users can have certain filters expanded to allow redemption at an expanded list or category of merchants. The pre-established relationship between the points and redemption currency can be altered to accommodate elite, or preferred, or other targeted populations.

In an embodiment, preferred merchants can be engaged to offer superior value to users that choose to stay at their properties using the redemption vehicle for payment.

B. Exemplary Implementations

Figure 1:
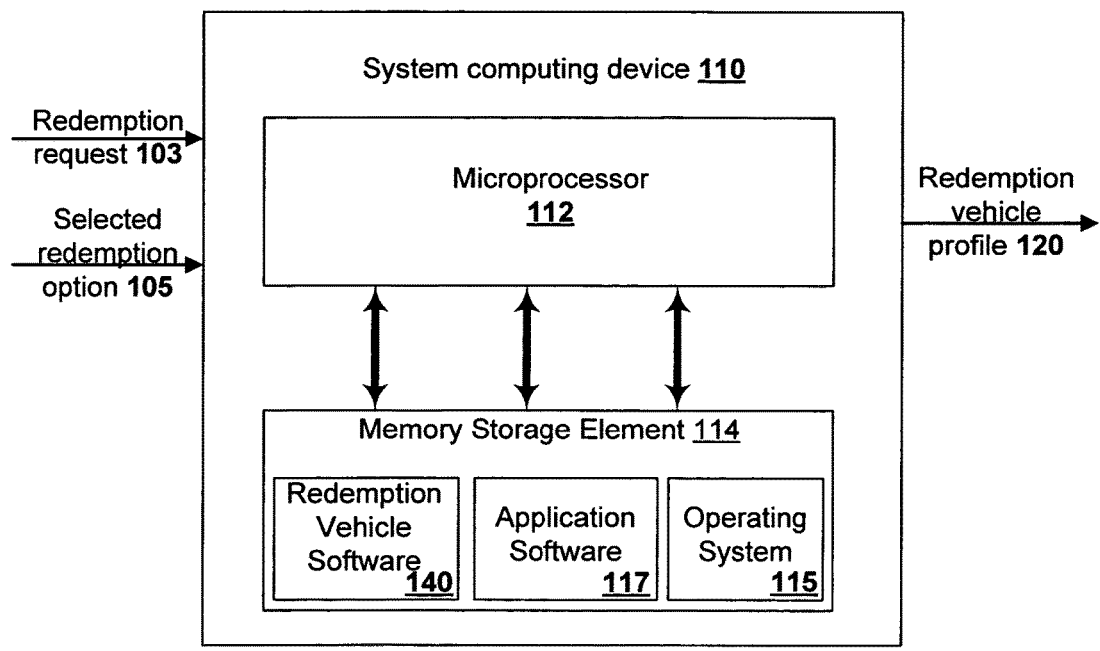
FIG. 1 is an exemplary operating environment.
Figure 2:
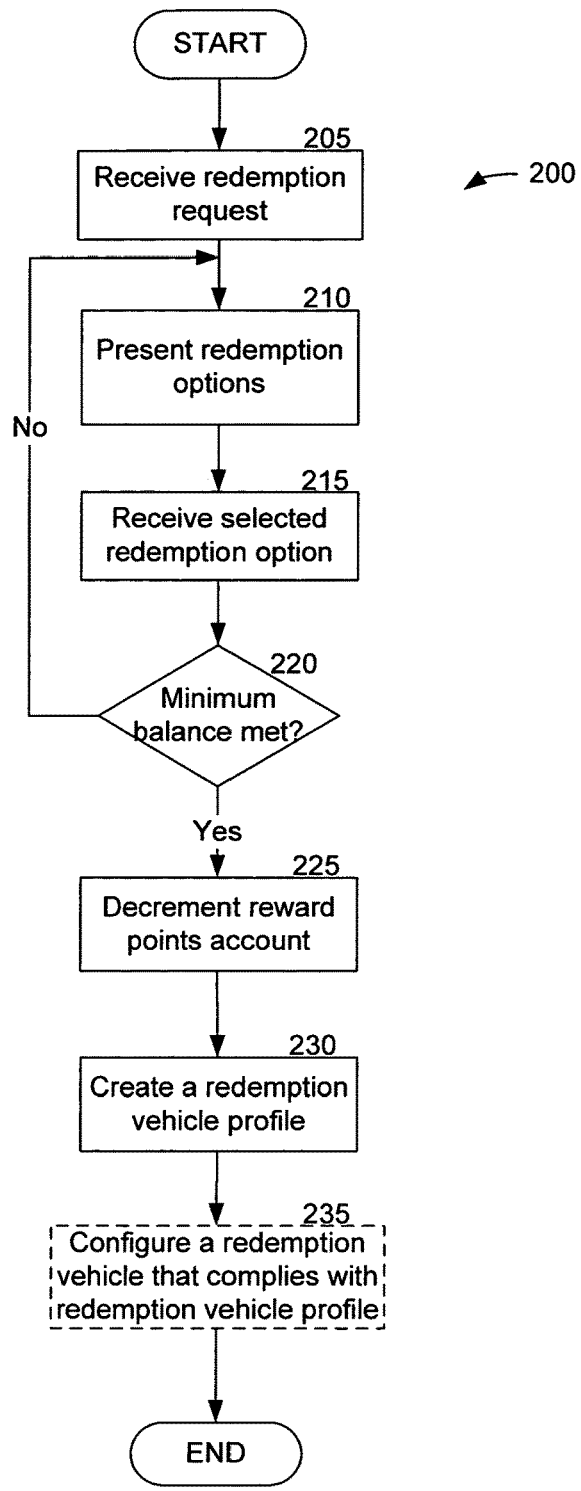
FIG. 2 is a flowchart representing an exemplary method.

Described herein are exemplary functional implementations of the methods of the invention. FIG. 2 is a flowchart 200 illustrating an algorithm that describes the operation of the redemption vehicle software 140 (see FIG. 1). Any process descriptions or blocks in the flowcharts can be understood as representing modules, segments, portions of code, or hardware components, which may include one or more executable instructions for implementing specific logical functions or blocks in the process. Alternative implementations are included within the scope of the invention in which functions may be executed out of order from that shown or discussed, including substantially concurrently or in reverse order, depending on the functionality involved, as can be understood by those reasonably skilled in the art.

In block 205, a redemption request, such as redemption request 103 (see FIG. 1) is received. The redemption request may be received via a network, telephone, or some other suitable communication media. To receive the redemption request via a network, a networked user may transmit the redemption request using the Internet, for example. Alternatively, a user may give the redemption request to a customer service representative for a call center. In response, the call center representative, may enter the redemption request using a terminal (not shown) connected to the system computing device 110 (see FIG. 1). The redemption request may include information identifying the user's associated reward account, as well as other information such as name, address, or account pin code.

Redemption options are presented in block 210. These redemption options may include displaying redemption levels associated with a designated number of reward points. For example, 10,000 reward points, 30,000 reward points, and 75,000 reward points may correspond to redemption levels 1, 2, and 3 respectively. The redemption options can be used in granting special privileges to users with a certain status. For example, the redemption options can grant reward account users with elite, or preferred, status, for example, certain privileges such as an expanded list or category of merchants where the universal redemption vehicle is accepted. In an alternative embodiment, the redemption options can also be used in varying the relationship between the reward points and redemption currency. For example, fewer points may be needed for elite, or preferred, users. The relationship between the reward points and the redemption currency is described in detail with reference to block 235. Finally, the redemption options can be used in granting reward account users that use the redemption vehicle software 140 other benefits or amenities from competing merchants.

In block 215, a selected redemption option, like selected redemption option 105 (see FIG. 1) is received. As described with reference to block 205, this selected redemption option from the user may be received via a telephone, network, or some other suitable media. Generally, a reward account user sends the selected redemption option response after viewing the redemption options presented in block 210. The selected redemption option may include the desired redemption level, type of merchant, an amenity from a competing merchant, or some other suitable type of information.

It is determined whether a minimum balance in the user's reward account is met at block 220. As described with reference to block 210, the redemption options can include redemption levels. In block 220, the reward account associated with the user is evaluated to determine whether the points in the account satisfy the redemption option selected by the user in block 215. When the minimum balance is not met, block 210 is repeated.

In block 225, the reward points in the user's account are decremented. If the points in the reward account is stored within a table in the memory storage element, decrementing the points can occur by replacing a stored point value for the account with a point value representing the difference between the stored point value and the redeemed point value. For example, a stored point value may be 85,000 points and a user may opt to redeem 75,000 points. In this example, the stored point value of 85,000 is replaced with 10,000, which is the difference between 85,000 and 75,000.

A redemption profile is created in block 230. The redemption profile includes data used in specifying the exact type of universal redemption vehicle that should be configured. For example, the redemption profile may include the number of redeemed points, a translation formula that transforms the redeemed points into a redemption currency, a list of applicable merchants, as well as other information. Other identifying information within the redemption profile can include a name, or some personal message that should be displayed on the universal redemption vehicle. For example, the identifying information can be Happy Birthday Susan Doe or simply the name of the user associated with the reward account. In addition, the redemption profile can include other identifying information that can be used in identification verification when the universal redemption vehicle is used. For example, the redemption profile can include a field that identifies the name of the vehicle user.

In the dotted block 235, a redemption profile that complies with the redemption vehicle profile is optionally configured. In one embodiment, block 235 can be completed by a third party. For this embodiment, the system computing device 100 transmits the redemption vehicle profile 120 to the third party, as shown in FIG. 1. In an alternative embodiment, the algorithm 200 may include the optional block 235. Instead of transmitting the redemption vehicle profile 120 to an external third party, the system computing device 110 processes the redemption vehicle profile in block 235 to configure the redemption vehicle. Configuring the universal redemption vehicle involves creating a universal redemption vehicle that meets all of the specifics defined in the redemption vehicle profile. For example, it includes creating a universal redemption vehicle that with a redemption value, which reflects the number of redemption points and the translation formula between the redemption points and the redemption currency. In addition, configuring the universal redemption vehicle involves applying identifying information in the redemption vehicle profile to the created universal redemption vehicle.

Figure 3:
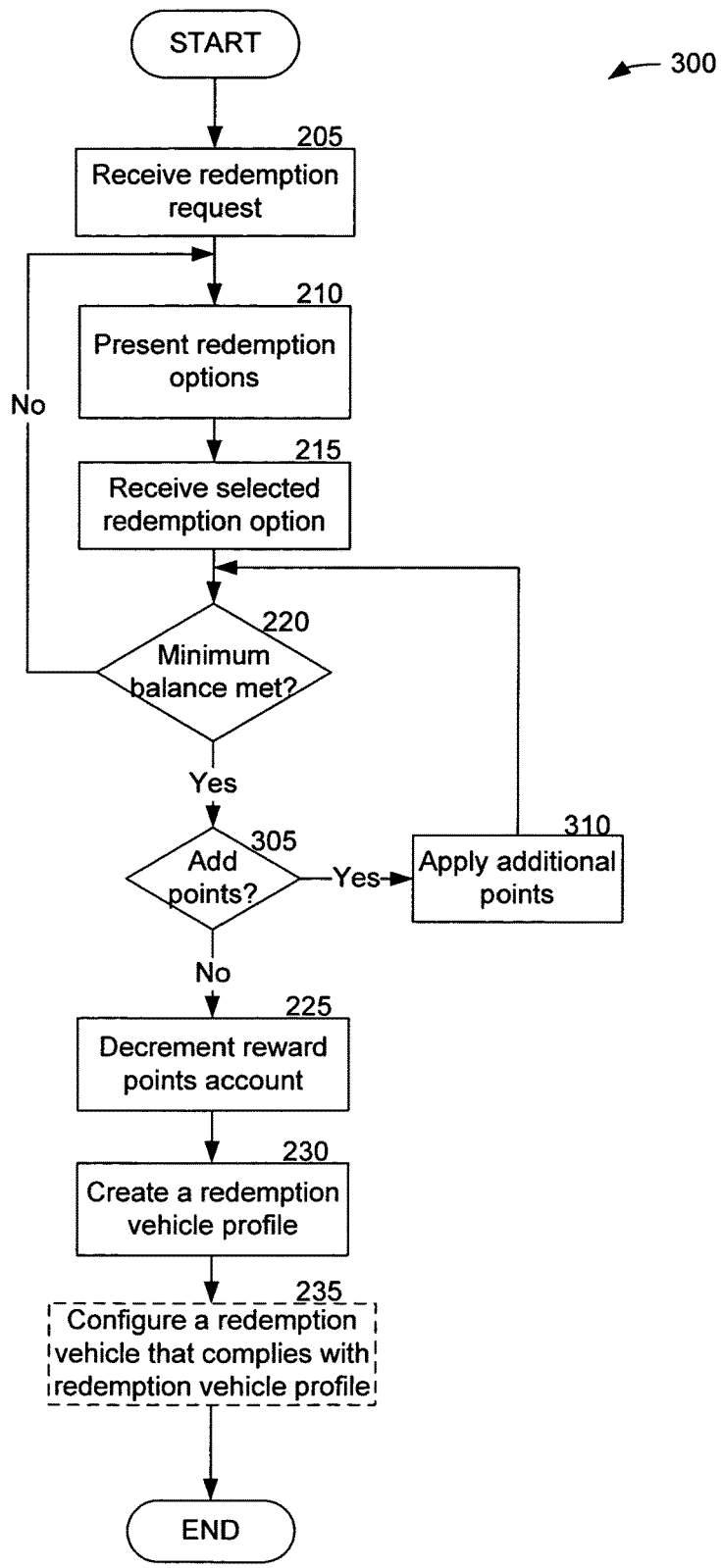
FIG. 3 is a flowchart representing an exemplary method.

Turning now to FIG. 3, it is a flowchart 300 of an alternative implementation of the flowchart 200. This flowchart 300 is essentially the same as the flowchart 200, except that it includes additional block 305 and block 310. For the sake of brevity, the description of block 205 through block 220 that precede block 305 is not repeated here. In block 305, it is determined whether points should be added. In this implementation, there is added functionality in that the resulting universal redemption vehicle can be reloaded. In other words, a user with reward points can decide whether more points are added to the associated reward account. More points are applied to the account in block 310. Points can be added by incrementing the reward points account in the same manner that the reward point account is decremented, which is described with reference to block 225. Since block 225 through block 235 is described with reference to FIG. 2, that description is not repeated here.

Figure 4:
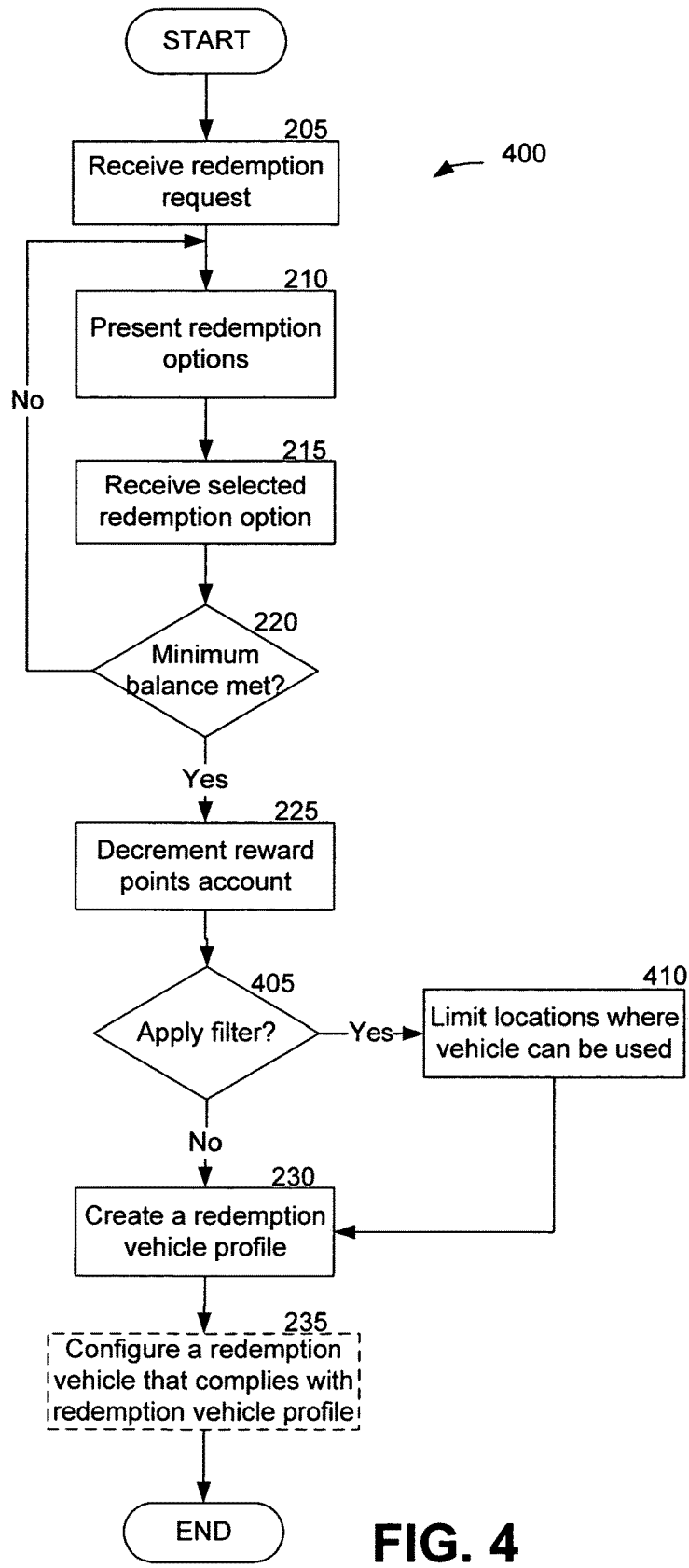
FIG. 4 is a flowchart representing an exemplary method.

Turning now to FIG. 4, it is a flowchart 400 of another alternative implementation of the flowchart 200. This flowchart 400 is essentially the same as the flowchart 200, except that it includes additional block 405 and block 410. For the sake of brevity, the description of block 205 through block 225 that precede block 405 is not repeated here. In block 405, it is determined that a filter should be applied. In this implementation, there is added functionality in that applying a filter can limit places where the universal redemption vehicle can be used. For example, an reward points account can be limited in the locations (or the industry vertical) where the vehicle can be used. If a filter is applied, locations were the vehicle can be used are limited in block 410. To limit use locations, information regarding applicable merchants can be included within the redemption vehicle profile that is created in block 230. Since block 235 is described with reference to FIG. 2, that description is not repeated here.

Though not shown, an alternative embodiment can result by combining the flowchart 300 shown in FIG. 3 with the flowchart 400 shown in FIG. 4. In other words, an alternative embodiment can include both the reloadable point feature described with reference to block 305 and block 310 (see FIG. 3) with the filter feature described with reference to block 405 and block 410 (see FIG. 4). This alternative embodiment can also include the remaining blocks in FIG. 3 and FIG. 4 (i.e., blocks 205-220, block 225, block 230, and block 235). For the sake of brevity, the descriptions of these blocks are not repeated here.

The particular embodiments disclosed above are illustrative only, as the invention may be modified and practiced in different, but equivalent, manners apparent to those skilled in the art having the benefit of the teachings herein. Furthermore, no limitations are intended to the details of construction or design herein shown. It is therefore evident that the particular embodiments disclosed above may be modified and all such variations are considered within the scope and spirit of the invention.

II. Exemplary Universal Vehicle

For illustration purposes only, described herein is a universal vehicle for use in the lodging industry. A Lodging Redemption Card can be created for a subset of users, for example a Priority Club. These users can accumulate points through stays at a specific hotel chain, the points being loaded onto the Lodging Redemption Card upon user request. The Lodging Redemption Card can either have a non-monetized value or a monetized value (i.e., a prepaid card). Users can redeem points accumulated for lodgings stays at any hotel, at anytime, or alternatively, at a specific hotel, at anytime.

Users can be provided a selection of redemption increments listed by value that correspond to predetermined redemption levels of points. Users must have sufficient points in their accounts to participate in the redemption process. A value will then be loaded onto the Lodging Redemption Card as a redemption currency. The user can then book a room and use the card towards full or partial payment. The Lodging Redemption Card can be accepted at any hotel that accepts the affiliated association as noted on the card. Filters can be used to allow redemption only at lodging merchants or any other merchants chosen and approved by the point provider.

This exemplary implementation has particular value in that no other hospitality lodging companies allow blanket redemption of proprietary loyalty currency at any hospitality merchant at any time.

A unique feature of the present invention is that users who redeem for such stays can also be eligible to earn competitive program points or other amenities and soft benefits at a competitive merchant property and within the affiliated competitive loyalty program. The present invention is also unique in that many competitive hotel programs restrict/black-out certain dates for redemption. With the present invention all dates are available via redemption currency.

III. Exemplary Systems

FIG. 1 is block diagram of an exemplary system 100 for configuring a universal redemption vehicle that includes a system computing device 110. This device can receive a redemption request from users (not shown). The redemption vehicle can be a card, biometric account, voucher, or some other suitable vehicle. A user with a designated reward point account may request redemption of points within the reward point account by sending a redemption request 103. In one embodiment, the system computing device 110 may receive the redemption request via telephone. Alternatively, the system computing device 110 may receive the redemption request 103 electronically. If the system computing device 110 presents the user with redemption options, a user can specify the desired option by sending a selected redemption request 105. The redemption options are described in greater detail with reference to FIG. 2.

The system computing device 110 may include a microprocessor 112 and a memory element 114. The microprocessor 112 can be any special purpose or general purpose processor capable of executing the instructions within software stored on the memory element 114. The memory element 114 can include any one or a combination of volatile memory elements (e.g., random access memory (RAM), such as DRAM, SRAM, etc.) and non-volatile memory elements (e.g., RAM, ROM, hard-drive, tape, CDROM, etc.). Moreover, the memory element 114 may incorporate electronic, magnetic, optical, and/or other types of storage media. In addition, the memory element 114 can have a distributed architecture, where various components are situated remotely from one another, but are accessible by the microprocessor 112.

The software in memory element 114 may include one or more separate programs, each of which comprise one or more code segments, which are an ordered listing of executable instructions for implementing logical functions. In the example of FIG. 1, the software in the memory element 114 includes an operating system 115, application software 117, and redemption vehicle software 140. The application software 117 is executed by the microprocessor 112 in order to perform task specific operations of the system computing device 110. The redemption vehicle software 140 includes the software code segments that are executed by the microprocessor 112 or another device for configuring a universal redemption vehicle. This software is described in more detail with reference to the flowcharts described previously.

As the system computing device 110 receives the redemption request 103 and the selected redemption option 105, the microprocessor 112 using the redemption vehicle software 140 can create a redemption vehicle profile 120. The processes involved in creating the redemption vehicle profile 120 are described in detail with reference to FIGS. 2-4. After the redemption vehicle profile 120 is created, the system computing device 110 can transmit this profile to an external device, such as a vehicle manufacturing machine (not shown). In response to receiving the redemption vehicle profile, the vehicle manufacturing machine can actually generate a universal redemption vehicle.

After a universal redemption vehicle is generated, it can be used at a host of industry verticals. Industry verticals can include lodging, retail, airline, car rental, entertainment related activities, sporting events, sporting activities, or some other suitable industry vertical. Because the universal redemption vehicle can be used in various industry verticals, a user may accumulate points in one industry vertical and get services using the universal redemption vehicle in a combination of industry verticals, within the same industry vertical, or another industry vertical. For example, a user may accumulate points in a reward account associated with a hotel but use the universal redemption vehicle for airline services.

Instead of being stored within the memory element 114, the redemption vehicle software 140 can be stored on a computer-readable medium. In the context of this document, a "computer-readable medium" can be any means that can contain, store, communicate, propagate, or transport the program for use by or in connection with the instruction execution system, apparatus, or device. The computer-readable medium can be, for example, but, not limited to, an electronic, magnetic, optical, electromagnetic, infrared, or semiconductor system, apparatus, device, or propagation medium. More specific examples (a non-exhaustive list) of the computer-readable medium can include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium can even become paper or another suitable medium upon which the program is printed. The program can be electronically captured, via, for instance, optical scanning of the paper or other medium, then compiled, interpreted or otherwise processed in a suitable manner if necessary, and then stored in a computer memory.

Also disclosed is a reward point system comprising an industry vertical reception unit for receiving a user selected monetary value in a selected industry vertical, a point collection unit for receiving a quantity of points associated with the monetary value in the selected industry vertical, a redemption vehicle profile creation unit for generating a profile, and a redemption vehicle generation unit for loading the profile onto a redemption vehicle wherein the points on the redemption vehicle can be redeemed at any merchant in the selected industry vertical. The industry vertical reception unit can further comprise a point balance determining unit for determining if a user's point balance meets a minimum balance required for the monetary value in the selected industry vertical. The industry vertical reception unit can also further comprise a point balance addition unit for adding points to a user's point balance. The points can be obtained from one merchant. The points can be obtained from a plurality of merchants. The profile can comprise, for example, a user name, a selected industry vertical, and a quantity of points associated with the selected industry vertical. The industry vertical can include, for example, lodging, retail purchases, airlines, car rentals, entertainment related activities, sporting events, sporting activities, cruises, and travel packages. The redemption vehicle can be, for example, a magnetic stripe card, a smart card, and a code. The redemption vehicle can be a card that can be "swiped." Swiped includes passing through a magnetic stripe reader, RFID based detection, and the like. The redemption vehicle can be personalized in various manners, for example with a user name/gift names. The redemption vehicle can store user information that could be used for check in/user identification. The redemption vehicle can be used to load and redeposit points into another user's account.

Figure 6:
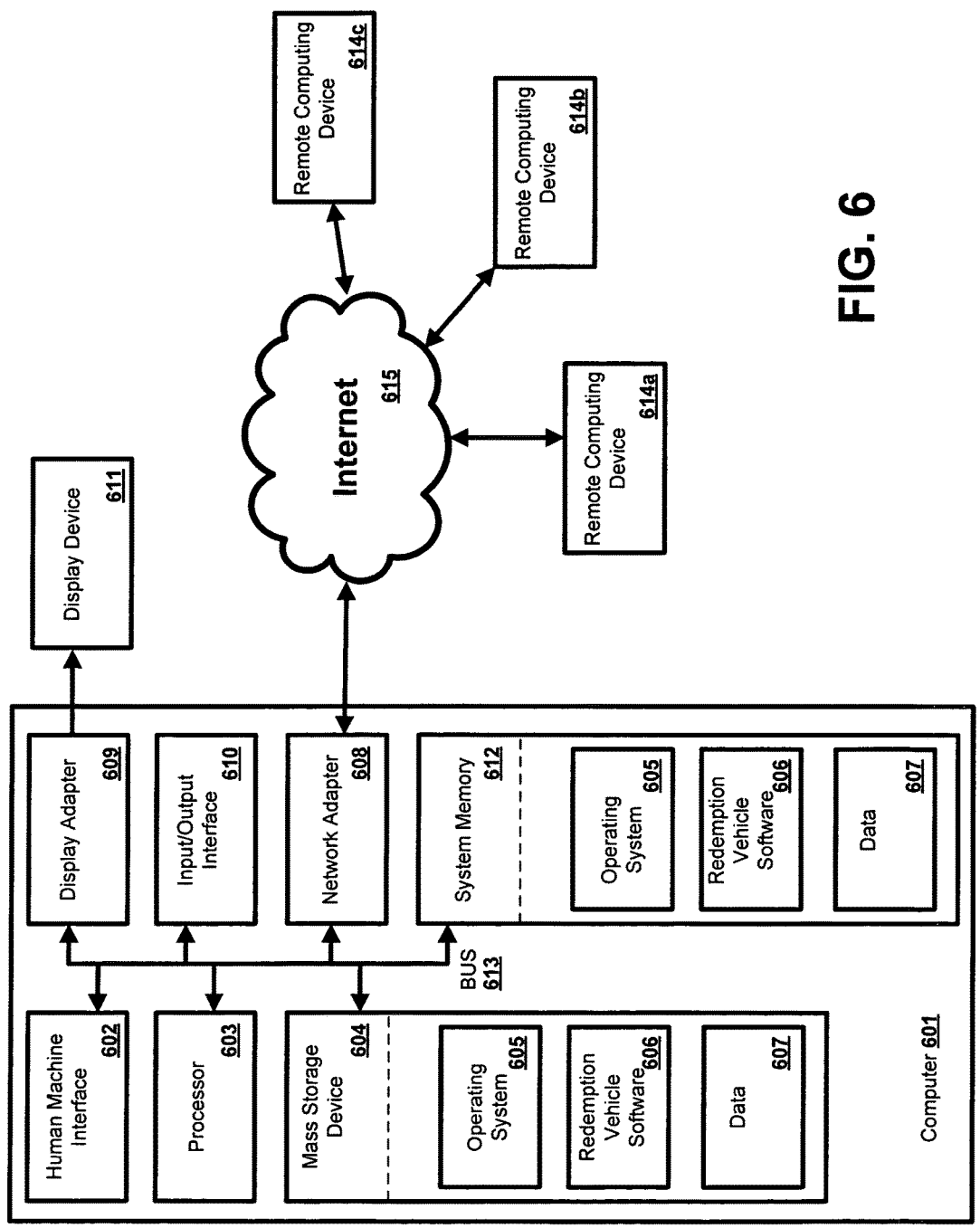
FIG. 6 is an exemplary operating environment.

The invention has been described above as comprised of units. This is a functional description. The function can be performed by software, hardware, or a combination of software and hardware. A unit can be software, hardware, or a combination of software and hardware. The units can comprise the Redemption Vehicle Software 605 as illustrated in FIG. 6 and described below. The units can comprise a computer 601 as illustrated in FIG. 6 and described below.

FIG. 6 is a block diagram illustrating an exemplary operating environment for performing the disclosed method. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The method can be operational with numerous other general purpose or special purpose computing system environments or configurations. Examples of well known computing systems, environments, and/or configurations that may be suitable for use with the system and method include, but are not limited to, personal computers, server computers, laptop devices, and multiprocessor systems. Additional examples include set top boxes, programmable consumer electronics, network PCs, minicomputers, mainframe computers, distributed computing environments that include any of the above systems or devices, and the like.

The method may be described in the general context of computer instructions, such as program modules, being executed by a computer. Generally, program modules include routines, programs, objects, components, data structures, etc. that perform particular tasks or implement particular abstract data types. The system and method may also be practiced in distributed computing environments where tasks are performed by remote processing devices that are linked through a communications network. In a distributed computing environment, program modules may be located in both local and remote computer storage media including memory storage devices.

The method disclosed herein can be implemented via a general-purpose computing device in the form of a computer 601. The components of the computer 601 can include, but are not limited to, one or more processors or processing units 603, a system memory 612, and a system bus 613 that couples various system components including the processor 603 to the system memory 612.

The system bus 613 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus. This bus, and all buses specified in this description can also be implemented over a wired or wireless network connection. The bus 613, and all buses specified in this description can also be implemented over a wired or wireless network connection and each of the subsystems, including the processor 603, a mass storage device 604, an operating system 605, Redemption Vehicle software 606, data 607, a network adapter 608, system memory 612, an Input/Output Interface 610, a display adapter 609, a display device 611, and a human machine interface 602, can be contained within one or more remote computing devices 614*a,b,c* at physically separate locations, connected through buses of this form, in effect implementing a fully distributed system.

The computer 601 typically includes a variety of computer readable media. Such media can be any available media that is accessible by the computer 601 and includes both volatile and non-volatile media, removable and non-removable media. The system memory 612 includes computer readable media in the form of volatile memory, such as random access memory (RAM), and/or non-volatile memory, such as read only memory (ROM). The system memory 612 typically contains data such as data 607 and/or program modules such as operating system 605 and Redemption Vehicle software 606 that are immediately accessible to and/or are presently operated on by the processing unit 603.

The computer 601 may also include other removable/non-removable, volatile/non-volatile computer storage media. By way of example, FIG. 6 illustrates a mass storage device 604 which can provide non-volatile storage of computer code, computer readable instructions, data structures, program modules, and other data for the computer 601. For example, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules can be stored on the mass storage device 604, including by way of example, an operating system 605 and Redemption Vehicle software 606. Each of the operating system 605 and Redemption Vehicle software 606 (or some combination thereof) may include elements of the programming and the Redemption Vehicle software 606. Data 607 can also be stored on the mass storage device 604. Data 607 can be stored in any of one or more databases known in the art. Examples of such databases include, DB2®, Microsoft® Access, Microsoft® SQL Server, Oracle®, mySQL, PostgreSQL, and the like. The databases can be centralized or distributed across multiple systems.

A user can enter commands and information into the computer 601 via an input device (not shown). Examples of such input devices include, but are not limited to, a keyboard, pointing device (e.g., a "mouse"), a microphone, a joystick, a serial port, a scanner, and the like. These and other input devices can be connected to the processing unit 603 via a human machine interface 602 that is coupled to the system bus 613, but may be connected by other interface and bus structures, such as a parallel port, game port, or a universal serial bus (USB).

A display device 611 can also be connected to the system bus 613 via an interface, such as a display adapter 609. A computer 601 can have more than one display adapter 609 and a computer 601 can have more than one display device 611. For example, a display device can be a monitor, an LCD (Liquid Crystal Display), or a projector. In addition to the display device 611, other output peripheral devices can include components such as speakers (not shown) and a printer (not shown) which can be connected to the computer 601 via Input/Output Interface 610.

The computer 601 can operate in a networked environment using logical connections to one or more remote computing devices 614a,b,c. By way of example, a remote computing device can be a personal computer, portable computer, a server, a router, a network computer, a peer device or other common network node, and so on. Logical connections between the computer 601 and a remote computing device 614a,b,c can be made via a local area network (LAN) and a general wide area network (WAN). Such network connections can be through a network adapter 608. A network adapter 608 can be implemented in both wired and wireless environments. Such networking environments are commonplace in offices, enterprise-wide computer networks, intranets, and the Internet 615.

For purposes of illustration, application programs and other executable program components such as the operating system 605 are illustrated herein as discrete blocks, although it is recognized that such programs and components reside at various times in different storage components of the computing device 601, and are executed by the data processor(s) of the computer. An implementation of Redemption Vehicle software 606 may be stored on or transmitted across some form of computer readable media. Computer readable media can be any available media that can be accessed by a computer.

The processing of the disclosed method can be performed by software components. The disclosed method may be described in the general context of computer-executable instructions, such as program modules, being executed by one or more computers or other devices. Generally, program modules include computer code, routines, programs, objects, components, data structures, etc. that perform particular tasks or implement particular abstract data types. The disclosed method may also be practiced in grid-based and distributed computing environments where tasks are performed by remote processing devices that are linked through a communications network. In a distributed computing environment, program modules may be located in both local and remote computer storage media including memory storage devices.

While this invention has been described in connection with preferred embodiments and specific examples, it is not intended that the scope of the invention be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A reward point system comprising:
a system computing device comprising:
at least one processor; and
a memory in electronic communication with the at least one processor, said memory storing a redemption vehicle application configured, upon execution, to cause the system computing device to, at least:
receive a user redemption request, the user redemption request including information identifying a reward account associated with a user;
receive, after receiving the user redemption request, user selection of a quantity of points; and
generate, in response to the user redemption request, a profile data structure comprising an indication of industry vertical, a specification of a set of merchants of the industry vertical eligible to participate in a redemption and a translation formula associated with the industry vertical specifying a transformation of reward points into a redemption currency, wherein the set of merchants eligible to participate in the redemption is based at least in part on a privileged status of the user with respect to the reward account such that a first privileged status with respect to the reward account is associated with a first nonempty set of merchants and a second privileged status with respect to the reward account is associated with a second set of merchants that contains and is larger than the first nonempty set of merchants and wherein the translation formula is based at least in part on a number of reward points associated with a reward account of the user such that the higher the number of reward points associated with the reward account, the fewer the number of reward points transformed by the translation formula per unit of redemption currency, said profile data structure configured to be processed in order to generate a redemption vehicle device loaded with the redemption currency in accordance with the translation formula identified in the profile data structure and such that identifying information in the profile data structure is applied to the newly generated redemption vehicle device, wherein the redemption currency on the redemption vehicle device can be redeemed at any of the set of merchants eligible to participate in the redemption as indicated in the profile data structure.

2. The system of claim 1 wherein the redemption vehicle application is further configured, upon execution, to cause the system computing device to determine if a user's point balance meets a minimum balance required for a monetary value in the industry vertical.

3. The system of claim 1 wherein the redemption vehicle application is further configured, upon execution, to cause the system computing device to add points to a user's point balance.

4. The system of claim 1, wherein the industry vertical is selected from the group consisting of:
  lodging;
  retail purchases;
  airlines;
  car rentals;
  entertainment related activities;
  sporting events;
  sporting activities;
  cruises; and
  travel packages.

5. The system of claim 1, wherein the redemption vehicle application is further configured, upon execution, to cause the system computing device to transmit the profile data structure.

6. The system of claim 5, further comprising:
  a vehicle manufacture machine in electronic communication with the system computing device, said vehicle manufacture machine configured to, at least:
    receive the profile data structure; and
    process the profile data structure in order to generate the redemption vehicle device.

7. A method for providing a redemption vehicle device comprising:
  maintaining a reward account for a user, the reward account associated with a number of reward points;
  receiving, by a system computing device over a network, a redemption request, said system computing device comprising a processor and a memory, wherein the memory stores a redemption vehicle application configured, upon execution, to cause the processor to perform one or more steps associated with providing a redemption vehicle device;
  generating, by the system computing device, a redemption vehicle profile data structure in response to the redemption request, said redemption vehicle profile data structure comprising an indication of an industry vertical comprised of a plurality of merchants, a specification of a set of the plurality of merchants eligible to participate in a redemption and a translation formula associated with the industry vertical specifying a transformation of reward points into a redemption currency, wherein the set of the plurality of merchants eligible to participate in a redemption is based at least in part on a privileged status of the user with respect to the reward account such that a first privileged status with respect to the reward account is associated with a first nonempty set of merchants and a second privileged status with respect to the reward account is associated with a second set of merchants that contains and is larger than the first nonempty set of merchants and wherein the translation formula is based at least in part on the number of reward points associated with the reward account such that the higher the number of reward points associated with the reward account, the fewer the number of reward points transformed by the translation formula per unit of redemption currency;
  generating, by the system computing device, a redemption vehicle device in response to and based on the redemption vehicle profile data structure wherein the redemption vehicle device is loaded with the redemption currency in accordance with the translation formula identified in the profile data structure, and the redemption currency on the redemption vehicle device can be redeemed at any of the set of the plurality of merchants eligible to participate in the redemption as indicated in the profile data structure; and
  applying, by the system computing device, identifying information in the profile data structure to the newly generated redemption vehicle device.

8. The method of claim 7, wherein receiving a redemption request further comprises:
  determining if a minimum balance of points is available to fulfill the redemption request; and
  presenting an option to add points so as to meet the minimum balance.

9. The method of claim 7, wherein the industry vertical is selected from the group consisting of:
  lodging;
  retail purchases;
  airlines;
  car rentals;
  entertainment related activities;
  sporting events;
  sporting activities;
  cruises; and
  travel packages.

10. The method of claim 7, wherein the translation formula is based at least in part on a privileged status of the user with respect to the reward account.

11. The method of claim 7, wherein:
  the reward account is associated with a number of reward points;
  a status of the user is determined based at least in part on the number of reward points associated with the reward account; and
  the translation formula is based at least in part on the determined status of the user.

12. The method of claim 7, wherein the user has a targeted status determined based at least in part on the user being a member of a corresponding targeted population and the translation formula is based at least in part on the determined targeted status of the user.

13. A method for providing a redemption vehicle device comprising:

receiving, by a system computing device, a redemption vehicle profile data structure, said redemption vehicle profile data structure comprising an indication of industry vertical, a specification of a set of merchants of the industry vertical eligible to participate in the redemption and a translation formula associated with the industry vertical specifying a transformation of reward points into a redemption currency, wherein the set of merchants eligible to participate in the redemption is based at least in part on a privileged status of a user with respect to a reward account such that a first privileged status with respect to the reward account is associated with a first nonempty set of merchants and a second privileged status with respect to the reward account is associated with a second set of merchants that contains and is larger than the first nonempty set of merchants, wherein the industry vertical is comprised of a plurality of merchants and a number of reward points are received from one or more of the plurality of merchants that comprise the industry vertical, wherein the translation formula is based at least in part on the number of reward points associated with the reward account such that the higher the number of reward points associated with the reward account, the fewer the number of reward points transformed by the translation formula per unit of redemption currency, and wherein said system computing device comprising a processor and a memory, wherein the memory stores a redemption vehicle application configured, upon execution, to cause the processor to perform one or more steps associated with providing a redemption vehicle device; and generating, by the system computing device, a redemption vehicle device in response to and based on the redemption vehicle profile data structure wherein the redemption vehicle device is loaded with the redemption currency in accordance with the translation formula identified in the redemption vehicle profile data structure, such that identifying information in the profile data structure is applied to the newly generated redemption vehicle device and such that the redemption currency on the redemption vehicle device can be redeemed at any of the set of the plurality of merchants eligible to participate in the redemption as indicated in the profile data structure.

* * * * *